United States Patent
Vakhutinsky

(10) Patent No.: US 11,704,611 B2
(45) Date of Patent: Jul. 18, 2023

(54) INVENTORY ALLOCATION AND PRICING OPTIMIZATION SYSTEM FOR DISTRIBUTION FROM FULFILLMENT CENTERS TO CUSTOMER GROUPS

(71) Applicant: Oracle International Corporation, Redwood Shores, CA (US)

(72) Inventor: Andrew Vakhutinsky, Sharon, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 98 days.

(21) Appl. No.: 17/231,252

(22) Filed: Apr. 15, 2021

(65) Prior Publication Data
US 2022/0358436 A1 Nov. 10, 2022

(51) Int. Cl.
*G06Q 10/0631* (2023.01)
*G06Q 30/0201* (2023.01)

(52) U.S. Cl.
CPC ... *G06Q 10/06315* (2013.01); *G06Q 30/0206* (2013.01)

(58) Field of Classification Search
CPC .. G06Q 10/087; G06Q 30/0202; G06Q 50/28; G06Q 10/063; G06Q 10/04; G06Q 10/08
See application file for complete search history.

(56) References Cited

U.S. PATENT DOCUMENTS

| | | | |
|---|---|---|---|
| 8,165,904 B2* | 4/2012 | Srinivasan | G06Q 50/04 705/7.11 |
| 8,620,707 B1* | 12/2013 | Belyi | G06Q 10/087 705/28 |
| 10,423,923 B2* | 9/2019 | Harsha | G06Q 10/06393 |
| 10,922,646 B1* | 2/2021 | Humair | G06Q 10/087 |
| 10,956,865 B1* | 3/2021 | Kim | G06Q 10/08 |
| 11,410,117 B2* | 8/2022 | Wu | G06Q 30/0206 |
| 2002/0188529 A1* | 12/2002 | Krever | G06Q 10/087 705/28 |

(Continued)

OTHER PUBLICATIONS

Yuan, Qi, Modeling and Optimization of Resource Allocation in Supply Chain Management Problems Tennessee Research and Creative Exchange, University of Tennessee, May 2013 (Year: 2013).*

(Continued)

*Primary Examiner* — Scott L Jarrett
(74) *Attorney, Agent, or Firm* — Potomac Law Group, PLLC

(57) ABSTRACT

Embodiments optimize inventory allocation of a retail item, where the retail item is allocated from a plurality of different fulfillment centers to a plurality of different customer groups. Embodiments receive historical sales data for the retail item and estimate demand model parameters. Embodiments generate a network including first nodes corresponding to the fulfillment centers, second nodes corresponding to the customer groups, and third nodes between the first nodes and the second nodes, each of the third nodes corresponding to one of the second nodes. Embodiments generate an initial feasible inventory allocation from the first nodes to the second nodes and solves a minimum cost flow problem for the network to generate an optimal inventory allocation.

19 Claims, 4 Drawing Sheets

(56) References Cited

U.S. PATENT DOCUMENTS

| | | | |
|---|---|---|---|
| 2003/0069774 A1* | 4/2003 | Hoffman | G06Q 30/0201 705/7.29 |
| 2003/0212590 A1* | 11/2003 | Klingler | G06Q 30/0202 705/7.31 |
| 2005/0060270 A1* | 3/2005 | Ramakrishnan | G06Q 30/0207 705/400 |
| 2010/0268572 A1* | 10/2010 | Handley | G06Q 10/00 705/28 |
| 2012/0284083 A1* | 11/2012 | Wu | G06Q 10/08 705/7.31 |
| 2013/0073341 A1 | 3/2013 | Vakhutinsky et al. | |
| 2013/0211877 A1 | 8/2013 | Kushkuley et al. | |
| 2014/0180958 A1* | 6/2014 | Arunapuram | G06Q 10/047 705/338 |
| 2016/0063411 A1* | 3/2016 | Ravichandran | G06Q 10/06312 705/7.22 |
| 2016/0283882 A1 | 9/2016 | Ettl et al. | |
| 2019/0122176 A1 | 4/2019 | Wu et al. | |
| 2020/0082487 A1* | 3/2020 | Kishikawa | G06Q 10/06315 |
| 2020/0175461 A1* | 6/2020 | Lu | G06Q 10/04 |
| 2020/0175531 A1* | 6/2020 | Ma | G06F 17/16 |
| 2020/0380452 A1* | 12/2020 | Vakhutinsky | G06Q 10/06375 |

OTHER PUBLICATIONS

Oracle Retail Allocation 11.11.1—Operations Guide Oracle, 2005 (Year: 2005).*

Oracle Advance Planning—Implementation and User's Guide vols. 1 & 2 Oracle, May 2003 (Year: 2003).*

Harsha et al, "Dynamic Pricing of Omnichannel Inventories", Manufacturing & Service Operations Management 2019 21:1, 47-65.

International Search Report issued in the corresponding International Application No. PCT/US2020/033363, dated Jul. 14, 2020.

Lei et al,"Randomized Product Display (Ranking), Pricing, and Order Fulfillment for E-commerce Retailers" (Nov. 9, 2018). Available at SSRN: https://ssrn.com/abstract=3282019 or http://dx.doi.org/10.2139/ssrn.3282019.

Vakhutinsky, Retail markdown optimization under demand parameter uncertainty, Oracle Labs, Burlington, MA,.

Written Opinion of the International Search Report issued in the corresponding International Application No. PCT/US2020/033363, dated Jul. 14, 2020.

* cited by examiner

INVENTORY ALLOCATION AND PRICING OPTIMIZATION SYSTEM FOR DISTRIBUTION FROM FULFILLMENT CENTERS TO CUSTOMER GROUPS

FIELD

One embodiment is directed generally to a computer system, and in particular to a computer system for determining optimized pricing and inventory allocation of products.

BACKGROUND INFORMATION

For a retailer or any seller of products, at some point during the selling cycle a determination will likely need to be made on when to markdown the price of a product, possibly through promotions, and how much of a markdown to take. Price markdowns can be an essential part of the merchandise item lifecycle pricing. A typical retailer has between 20% and 50% of the items marked down (i.e., permanently discounted) and generates about 30-40% of the revenue at marked-down prices.

A determination of an optimized pricing markdown maximizes the revenue by taking into account inventory constraints and demand dependence on time period, price and inventory effects. An optimized markdown can bring inventory to a desired level, not only during the full-price selling period, but also during price-break sales, and maximize total gross margin dollars over the entire product lifecycle. However, price optimization systems typically do not take into consideration the allocation of inventory among many potential locations and its impact on the pricing.

SUMMARY

Embodiments optimize inventory allocation of a retail item, where the retail item is allocated from a plurality of different fulfillment centers to a plurality of different customer groups. Embodiments receive historical sales data for the retail item and estimate demand model parameters. Embodiments generate a network including first nodes corresponding to the fulfillment centers, second nodes corresponding to the customer groups, and third nodes between the first nodes and the second nodes, each of the third nodes corresponding to one of the second nodes. Embodiments generate an initial feasible inventory allocation from the first nodes to the second nodes and solves a minimum cost flow problem for the network to generate an optimal inventory allocation.

DETAILED DESCRIPTION

One embodiment is an optimization system for optimizing profit or revenue for a retail chain with multiple locations each served by multiple inventory warehouses. Embodiments optimize both the inventory allocation between warehouses and the pricing of the products.

Embodiments are directed to a system or method that maximizes the profit or revenue for a retail chain operating multiple locations supplied from multiple warehouses. The retail chain can include e-commerce implementations. Each warehouse can be connected to multiple locations and each location can be supplied from multiple warehouses.

Figure 1:
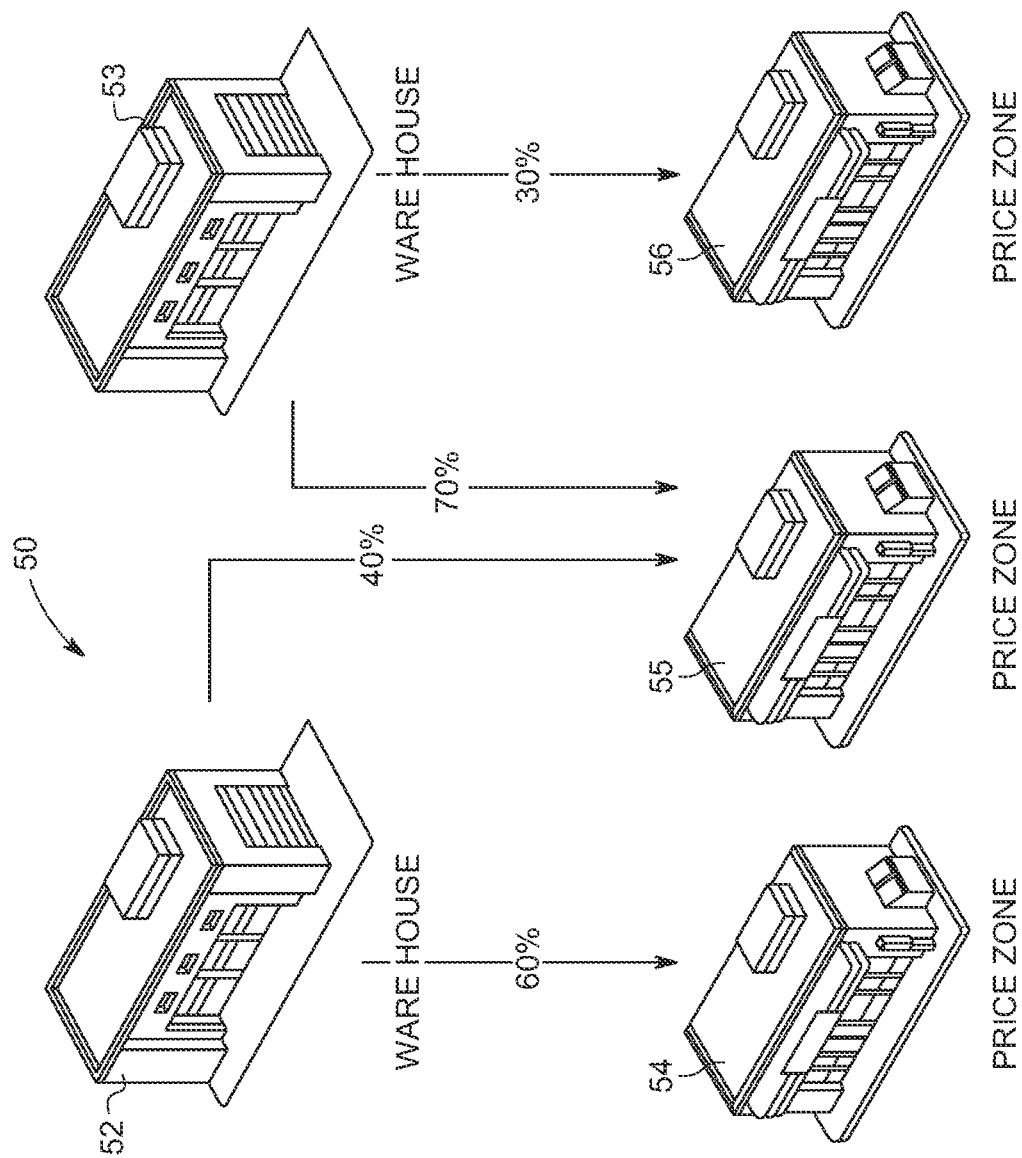
FIG. 1 is a block diagram of an example retail chain with multiple warehouses in accordance to embodiments.

FIG. 1 is a block diagram of an example retail chain 50 with multiple warehouses in accordance to embodiments. As shown, multiple retail locations 54-56 can be in the form of physical retail stores or a retail price zone that may include a cluster of multiple geographic common physical retail stores (or a single store) that use the same pricing. For example, a price zone can be based on geographic locations such as all retail stores in the Washington, D.C. area, or all retail stores within a 25 mile radius. Each price zone is served by one or more warehouses 52, 53 (also referred to as fulfillment centers ("FC")). When a single warehouse provides inventory to multiple price zones, the inventory will be allocated among the various price zones in embodiments. For example, for warehouse 52, 60% of its inventory is allocated to price zone 54, and 40% of its inventory is allocated to price zone 55. Similarly, for warehouse 53, 70% of its inventory is allocated to price zone 55, and 30% of its inventory is allocated to price zone 56. For purposes of this disclosure, each warehouse to price zone combination can be referred to as an arc or one or more links.

Allocating inventory to a price zone means that the inventory will be sold only at that price zone. Further, as each price zone is generally supplied from multiple warehouses the inventory can be allocated to a given price zone from multiple warehouses. It should be noted that the allocation described in this model does not necessarily mean physical shipment. In many situations, the inventory is virtually allocated for planning purposes to provide input to the price zone-specific price optimization, which is carried out with the objective to maximize the profit derived from selling the entire inventory allocated to the price zone at its stores. However, as disclosed below, changing the inventory allocation can result in the transportation of inventory (e.g., via trucking) to a different store or price zone then before the change.

Embodiments are applicable to e-commerce environments. A typical e-commerce retailer fulfills orders from multiple warehouses, or FCs, that are generally geographically dispersed and thus the cost of shipping an order to a customer can differ significantly depending on the FC. At the same time, when an item approaches its end of life, its inventory levels frequently vary greatly among the FCs. Therefore, maximizing total profit involves both assigning FCs to customers in order to balance the load among the FCs as well as pricing the item based on each customer's price elasticity and cost of service.

In contrast, more traditional brick-and-mortar retailers also supply their stores from multiple warehouses. As the stores are usually clustered into so-called price zones, it allows the retailer to execute a flexible pricing policy offering different prices in the price zones with different price sensitivity. In both e-commerce and brick-and-mortar embodiments, there are multiple supply centers and customer groups with variety of demand parameters and service costs.

Embodiments of the invention are directed in particular to items with a limited life cycle, such as fashion merchandise or electronics. These items lose nearly all their value after a certain amount of time as they have to be replaced by the new version of the product. When such an item approaches its end of life, its inventory is usually not replenished. If the inventory level at the beginning of the period is high enough that it cannot be sold by the exit date at its current price, a markdown is applied.

Figure 2:
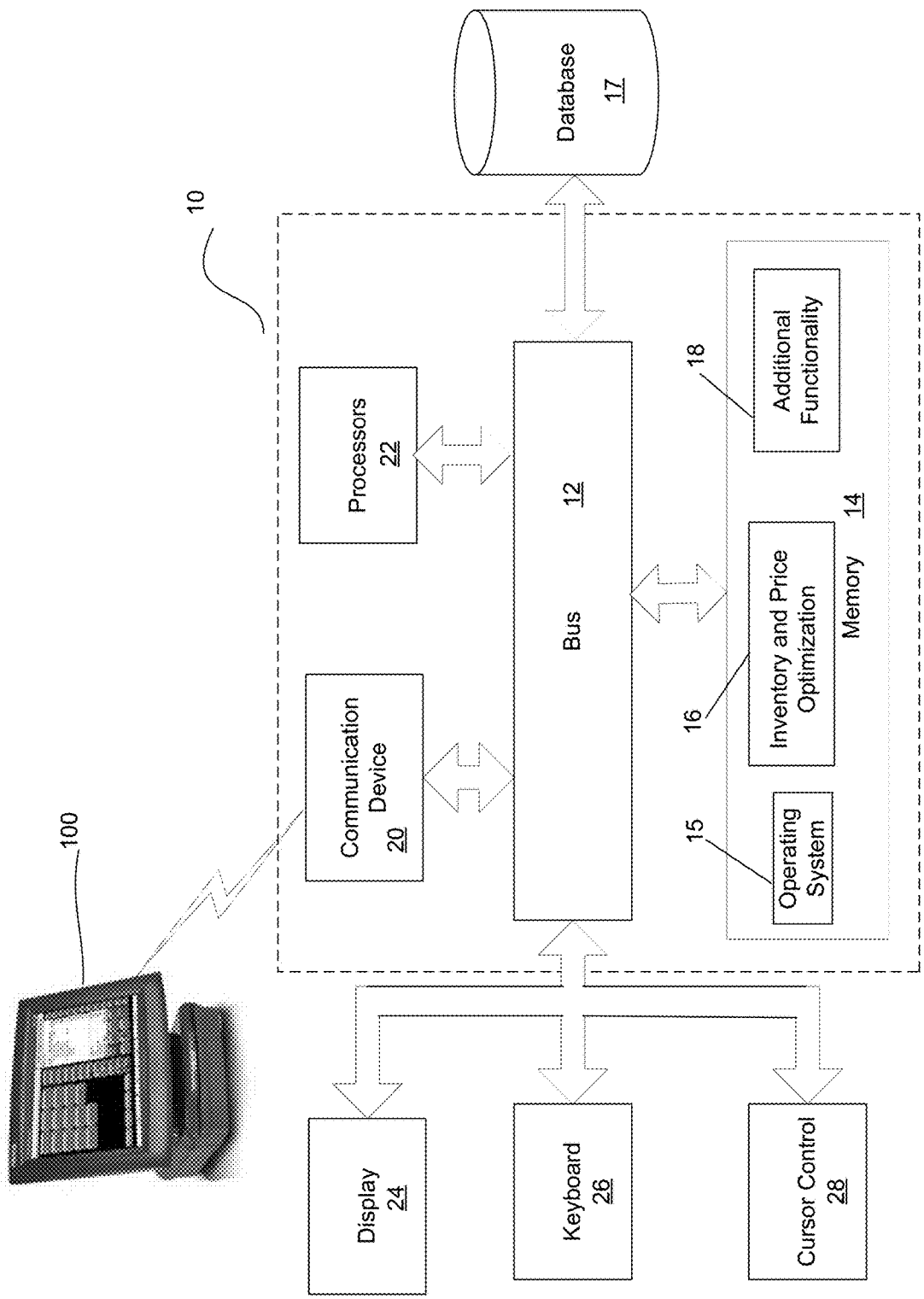
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can centrally provide the functionality for all of the entities of FIG. 1, or multiple system 10s can be located at one or more of the entities and the information and calculations can be consolidated to provide an overall pricing and inventory allocation solution.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an inventory and price optimization module 16 that jointly optimizes inventory allocation and markdown pricing for retail items, and all other functionality disclosed herein. System 10 can be part of a larger system. Therefore, system 10 can include one or more additional functional modules 18 to include the additional functionality, such as a retail management system (e.g., the "Oracle Retail Offer Optimization Cloud Service" or the "Oracle Retail Advanced Science Engine" ("ORASE") from Oracle Corp.) or an enterprise resource planning ("ERP") system or inventory management system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 generates transactional data and historical sales data (e.g., data concerning transactions of each item/SKU at each retail store) used for price and inventory optimization. POS terminal 100 itself can include additional processing functionality to optimize pricing and inventory allocation in accordance with one embodiment and can operate as a specialized inventory and pricing optimization system either by itself or in conjunction with other components of FIG. 2.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Known approaches that attempt to solve different aspects of markdown and related optimization problems due to demand uncertainty generally consider the demand parameters to be fixed and the demand uncertainty is modeled as fluctuations in demand realization. However, there is a need to consider the uncertain demand parameters. For example, in addressing the retail item markdown problem for various retailers, each retailer generally implements multiple rules essentially aimed at safeguarding against mispricing, especially underpricing and running out of stock early in the season, due to the incorrectly estimated price elasticity of the demand. For example, a retailer would limit the percentage of the single markdown price drop, or impose the limit on the earliest markdown and/or minimal time between the two consecutive markdowns. The latter two restrictions are meant to better learn the demand and price sensitivity before taking further actions.

More recently, retailers and in particular those with online channels have started using price randomization to arrive with a better estimate of the customer demand parameters. Nevertheless, there is always uncertainty in the demand parameters, especially its price elasticity, which is usually the most difficult parameter to estimate. Further, solving the markdown optimization problem requires a comprehensive predictive model, which accounts for various exogenous and endogenous effects typically confronting the retailer, such as holiday-driven change in customer demand, presence of similar items resulting in demand transference (i.e., demand cannibalization), and pricing and promotion effects.

In contrast, one embodiment formulates the markdown optimization model initially as a basic markdown problem for a single customer group served from the same FC. Another embodiment formulates for the model with multiple FCs supplying multiple customer groups at specific service costs and include a min-cost network flow approach to solving the joint inventory allocation and markdown optimization problem. Both embodiments include a closed-form solution and a gradient descent algorithm for a log-linear demand model and uniform distribution of the price elasticity parameter that allows for a straightforward practical implementation.

Joint Inventory Allocation And Markdown Optimization Problem

One embodiment considers a markdown problem with multiple warehouses or Fulfillment Centers ("FC") that supply goods to different groups of customers. The customers can be individual customers such as online shoppers or customer groups sharing the same demand parameters or, more generally, they could be stores or even groups of stores. The demand model parameters are assumed to not be known exactly but can be measured within certain limits. Each customer is assumed to have their demand modeled as a function of the product price with parameters that follow a known joint distribution. The problem embodiments solve is to find the best price to maximize the expected profit derived from selling the given amount of product inventory located at multiple FCs accounting for the costs of handling and shipping the product to the customer groups. It is also assumes that the sales period is bounded by a certain exit date, after which the product is salvaged at near-zero price. Further, it is assumed that there is no replenishment of the product in the sales period at the FC level but the product is replenished at the customer group level when the demand arises. Thus, when a customer group represents a brick-and-mortar store, the model would ignore the situation when the on-hand inventory at the store is shipped but not sold thus incurring the shipping costs without revenue.

Regarding the expected demand as a function of price $\bar{d}(p)$ and expected revenue $\bar{R}(p) = p\bar{d}(p)$, embodiments make the following two assumptions:

1. $\bar{d}(p) > 0$ for all $p > 0$ and monotonically decreasing function of price p.
2. The expected revenue $\bar{R}(p) \to 0$ as $p \to 0$ or $p \to +\infty$.

The first assumption does not allow modeling the demand as piece-wise linear function and the second assumption excludes the constant elasticity power law demand model (e.g., in the form $d(p) = \alpha p^{-\beta}$, $\beta = \text{const} > 0$). The time and price parameters as well as demand output are considered as continuous variables, which does not limit the practical applicability of the model as the integration in the model can be straightforwardly replaced with summation.

Basic Markdown Optimization Problem: A Single Customer Group Served From A Single FC In order to demonstrate markdown optimization under parameter uncertainty in accordance to embodiments, a basic markdown optimization problem of a single customer or a homogeneous customer population served from the same FC is disclosed. For this problem, assume there are S units of inventory that must be sold within time horizon T. There is no replenishment during this time period and all inventory unsold by exit time T is salvaged at a negligibly small near-zero price. The problem is formulated as finding the optimal pricing policy, that is, the price of an item as a function of time, $p: t \to p(t)$, $t \in [0, T)$. In general, the price policy function should satisfy some markdown constraints, the most important of which is to be non-increasing. Other examples of the constraints are limited price drops during markdown events and limited intervals between the drops. The set of the allowed price policies is denoted as P. Assume there is a demand function $d(t, p; \theta)$ of pricing policy $p \in P$ at the time t that also depends on function parameter vector $\theta$. Since in practice it is impossible to measure the exact parameter values, assume that $\theta$ is a realization of a random variable $\theta$, which follows a distribution given by p.d.f $f(\theta)$ with the domain dom(f). $\theta$ may include such components as price elasticity of demand, promotion lift, and sensitivity to the reference price.

In general, the demand as a function of time depends on the prior pricing decisions. For example, it could be prior promotions changing the customer reference price point, or customer perception of the fair price, and also affecting the future demand through the "pantry loading" effect. Another example is the inventory depletion effect when prior sales diminish the current inventory amount, which may negatively affect the current demand.

Since inventory is limited, the sell-off time $T_0$ for the given pricing policy can be defined as the time of the inventory exhaustion under the current pricing policy. It is determined as the solution to the following equation:

$$\int_0^{T_0} d(t, p; \theta) dt = S$$

Note that for some combinations of the demand models and pricing policies the sales may last infinitely long. In this case, $T_0 = \infty$. Define the end-of-sale time $T_1 = \min(T, T_0)$, that is, the time when the vendor runs out of the inventory or out of time whichever happens earlier.

The total revenue under pricing policy p can be expressed as:

$$R(p, \theta) = \int_0^{T_1} p(t) d(t, p; \theta) dt \quad (1)$$

Then the expected revenue can be expressed as:

$$\bar{R}(p) = \int_{dom(f)} R(p, \theta) f(\theta) d\theta, \quad (2)$$

and the markdown optimization problem is to find the optimal pricing policy p* that would maximize the expected revenue:

$$p^* = \underset{p \in P}{\arg\max} \bar{R}(p) \quad (3)$$

While in general, the solution to the above problem may not be computationally tractable when the dimension of the parameter vector $\theta$ is relatively high, it can be applied to the practical cases when only one or two components of the demand function parameters are estimated with uncertainty. In many practical cases, it is the price sensitivity or the price elasticity parameter that is the most difficult to estimate for several reasons. For example, if there are no observed price changes of a product, the only estimation of the price elasticity can be obtained from observing similar products. Another example is when the discounts occur during the seasonal decline for the product demand. In this case, due to the so-called endogeneity effect, when the lower prices correlate with the lower demand for the product, the price sensitivity coefficient can be estimated at a much lower absolute value or even with the opposite sign. The usual practice in this case is also to consider the estimation of the broader product set or apply the range of endogeneity-mitigating instruments. In both of the examples, the estimation of the price elasticity will be within a certain range. One embodiment, disclosed below, obtains the empirical distribution function of the coefficient estimates. The following shows how embodiments can be applied to a widely used special case of a log-linear demand model.

Special Case of Log-Linear Demand Model and Uniform Distribution of the Price Coefficient One of the simplest demand models, the log-linear demand model, is considered here, which is formulated as follows:

$$d(p,t) = s(t)\alpha e^{-\beta p} \quad (4)$$

where $s(t)$ is a seasonality factor independent of price. Without loss of generality it can be assumed that $\int_0^T s(t)dt = 1$. Then it can be shown that the optimal price policy for the model with exactly known parameters consists of a single optimal price $$p^* = \max(p_{opt}, p_{icp}) = \max\left(\frac{1}{\beta}, \frac{1}{\beta}\log\frac{\alpha T}{S}\right)$$

by finding the revenue-maximizing value $p_{opt}$ from the first-order optimality condition $$\frac{\partial(pd(p,t))}{\partial p} = 0$$

and the inventory-clearing price ("ICP") value $p_{icp}$ from the total demand over period T, $\int_0^T d(p,t)dt = S$.

Note that the first-order optimality condition for the revenue-maximizing price is equivalent to the price elasticity of demand being equal to one:

$$-\frac{\partial d(p,t)}{\partial p}\frac{p}{d(p,t)} = 1.$$

Also, the price is set to maximize the revenue when the inventory is high enough relative to the base demand $\alpha$ and the length of the sales period, or $$\log\frac{S}{\alpha T} > -1.$$

In this case, some of the inventory is left unsold. The above is summarized in the following equation:

$$p_{det}^* = \begin{cases} \frac{1}{\beta}\log\frac{\alpha T}{s}, & \text{if } \log\frac{\alpha T}{s} < 1 \\ \frac{1}{\beta}, & \text{otherwise} \end{cases} \quad (5)$$

In the optimal solution to the deterministic markdown optimization problem with any demand function, the optimal pricing policy is such that the inventory is never completely sold out before the end of the sales period. Otherwise, the price can be raised and the same amount of the inventory can yield higher revenue.

When the price coefficient is $\beta$ not known exactly, it can be shown that underpricing the item and running out of the inventory before the end of the season when the value of $\beta$ is overestimated results in greater revenue loss than overpricing the product when the value of $\beta$ is underestimated by the same amount. The following case of a specific distribution illustrates this:

Assume that the price coefficient $\beta$ is a realization of the random variable with uniform distribution $\beta \sim U(\beta_1, \beta_2)$. For a fixed price p denote by $\beta_0$ the value of the parameter $\beta$ at which the inventory is cleared within the sales period T:

$$\beta_0 = \frac{1}{p}\log\frac{\alpha T}{s} \quad (6)$$

For values of $\beta$ in the $[\beta_1, \beta_0]$ interval, the inventory is sold out yielding the revenue pS. For $\beta$ in the $[\beta_0, \beta_2]$ interval, since the inventory is not depleted, the sales per unit of time are $\alpha Te^{-\beta p}$. If $\beta_0 < \beta_1$, the inventory is never depleted; if $\beta_0 > \beta_2$, the inventory is always sold out. Combining the above, the revenue defined in Equation (1) above can be expressed as:

$$R(p,\beta) = p \cdot \begin{cases} S, & \text{if } \beta \in [\beta_1, \beta_0] \\ \alpha Te^{-\beta p}, & \text{if } \beta \in [\beta_0, \beta_2] \end{cases} \quad (7)$$

By substituting expression for the revenue from Equation (7) and p.d.f. for the uniform distribution $U(\beta_1, \beta_2)$, $$f(\beta) = \begin{cases} \frac{1}{\beta_2 - \beta_1}, & \text{if } \beta \in [\beta_1, \beta_2] \\ 0, & \text{otherwise} \end{cases},$$

into the general expression (2) for the expected revenue, the following is obtained:

$$\overline{R}(p) = \begin{cases} pS, & \text{if } p < p_1 \\ \frac{1}{\Delta\beta}\left(S\log\frac{\alpha T}{S} + S(1-\beta_1 p) - \alpha Te^{-\beta_2 p}\right), & \text{if } p \in [p_1, p_2] \\ \frac{\alpha T}{\Delta\beta}(e^{-\beta_1 p} - e^{-\beta_2 p}), & \text{if } p > p_2 \end{cases} \quad (8)$$

where the notation $$\Delta\beta = \beta_2 - \beta_1, \; p_1 = \frac{1}{\beta_2}\log\frac{\alpha T}{s} \text{ and}$$

$$p_2 = \frac{1}{\beta_1}\log\frac{\alpha T}{s}$$

is used.

When the value of $\beta$ is known exactly, that is, $\beta_1 = \beta_2 = \beta$, the last line in the Equation (8) can be computed as:

$$\lim_{\Delta\beta \to 0}\frac{\alpha T(e^{-\beta_1 p} - e^{-\beta_2 p})}{\Delta\beta} = -\alpha T\frac{\partial e^{-\beta p}}{\partial \beta} = \alpha Tpe^{-\beta p},$$

which coincides with the expression for the revenue for the revenue-maximizing price as disclosed earlier.

In order to find the revenue-maximizing price $p^* = \text{argmax}_p \bar{R}(p)$, the function for $\bar{R}(p)$ is differentiated from equation (8) over p to obtain:

$$\bar{R}'(p) = \frac{\partial \bar{R}(p)}{\partial p} = \begin{cases} S, & \text{if } p < p_1 \\ \frac{1}{\Delta\beta}(\beta_2 \alpha T e^{-\beta_2 p} - \beta_1 S), & \text{if } p \in [p_1, p_2] \\ \frac{\alpha T}{\Delta\beta}(\beta_2 e^{-\beta_2 p} - \beta_1 e^{-\beta_1 p}), & \text{if } p > p_2 \end{cases} \quad (9)$$

It is shown that $$\bar{R}'(p_1) = \frac{1}{\Delta\beta}(\beta_2 - \beta_1)S > 0 \text{ and}$$

$$\bar{R}''(p_1) = -\frac{1}{\Delta\beta}\beta_2^2 \alpha T e^{-\beta_2 p} < 0.$$

Therefore, the first order condition $\bar{R}'(p)=0$ delivers an optimal solution $$p^* = \frac{1}{\beta_2} \log \frac{\beta_2}{\beta_1} \frac{\alpha T}{s} \quad (10)$$

when $p^* < p_2$, which is:

$$\log \frac{\alpha T}{s} > \beta_1 \frac{\log \beta_2 - \log \beta_1}{\beta_2 - \beta_1} \quad (11)$$

The price defined in Equation (10) can be thought of as the modified inventory-clearing price ("ICP") defined in the first line of Equation (5). When the price coefficient is uncertain, the modified ICP is greater than the ICP in the deterministic case for any $\beta \in [\beta_1, \beta_2)$.

A comparison can be made between conditions of Equation (11) and those used to apply ICP in Equation (5). First, the right-hand side of Equation (11) converges to one as $\Delta\beta \to 0$; second, it can be seen that $$\beta_1 \frac{\log \beta_2 - \log \beta_1}{\beta_2 - \beta_1} < 1$$

when $\beta_2 > \beta_1$, which can be interpreted that a higher level of inventory is required to apply ICP when the price coefficient is not known exactly.

When condition of Equation (11) is not satisfied, $\bar{R}'(p_2) > 0$ and the optimal revenue-maximizing price is found in the interval $[p_2, \infty)$ as the solution to the first order condition:

$$p^* = \frac{\log \frac{\beta_2}{\beta_1}}{\beta_2 - \beta_1} \quad (12)$$

Similarly to the revenue-maximizing optimal price in the second line of Equation (5), the optimal price defined in Equation (12) does not depend on the inventory. That is, in this case the optimal markdown solution will have some unsold inventory at the exit date. Also, $$\lim_{\beta_1 \to \beta_2} \frac{\log \frac{\beta_2}{\beta_1}}{\beta_2 - \beta_1} = \frac{1}{\beta_2},$$

which coincides with the optimal price defined in Equation (5).

Further, in the case of an uncertain price coefficient, the optimal revenue-maximizing price is higher than the price that can be "naively" set to the reciprocal of the price coefficient mean value. In embodiments with uniform distribution it can be proved by comparing $p^*$ defined in Equation (12) to $$\frac{2}{\beta_1 + \beta_2}$$

using their Taylor expansions. Specifically, after setting $$x = \frac{\beta_2}{\beta_1} - 1,$$

it can be seen that:

$$\frac{\log(x+1)}{x} > \frac{1}{1 + x/2}$$

Finally, the solution to the optimal markdown pricing when the price coefficient is uniformly distributed in the $[\beta_1, \beta_2]$ interval can be summarized as follows:

$$p^* = \begin{cases} \frac{1}{\beta_2} \log \frac{\beta_2}{\beta_1} \frac{\alpha T}{s}, & \text{if } \log \frac{\alpha T}{s} > \beta_1 \frac{\log \frac{\beta_2}{\beta_1}}{\beta_2 - \beta_1} \\ \frac{\log \frac{\beta_2}{\beta_1}}{\beta_2 - \beta_1}, & \text{otherwise} \end{cases} \quad (13)$$

Joint Inventory Allocation and Markdown Optimization Problem for Multiple Customer Groups Served from Multiple FCs In general, the demand for a limited life span item will be fulfilled from several FCs. The demand is usually coming from several distinct groups with varying demand parameters. For example, the groups may be determined by the geographic locations with different socio-economic characteristics that affect their price elasticity. Embodiments can determine optimal markdown pricing of an item when its inventory is spread over several FCs. For this embodiment, assume that inventory at all FCs has the same exit date, after which it is salvaged at near-zero price. In addition, the cost associated with selling from each FC to each customer group may be distinct. In the example of the geographically dispersed customer groups, it could be delivery cost from an FC to a geographic location.

General Case of Multiple Customer Groups Served from Multiple FCs

Assume there are M FCs serving L customer groups that may be defined either by their locations or other parameters.

At each FC m, there is initial product inventory $S_m$. The product has its remaining life time T. Given the product demand function $d_\ell(p)$ at customer group $\ell$, and unit delivery cost to the customer group $\ell$ from FC m as $c_{m\ell}$, the optimization problem is to find the group-specific prices $p_\ell$ and amount of inventory $x_{m\ell}$ delivered from m to $\ell$ that maximizes profit, subject to FC inventory constraints.

Denote the total amount of inventory allocated to customer group $\ell$ as $S_\ell = \Sigma_{m \in M} x_{m\ell}$. Then the revenue-maximizing markdown price $p_\ell^*(S_\ell)$ for that group can be found by applying Equation (3), which now explicitly depends on the allocated inventory. The optimal expected revenue for that location becomes $\bar{R}_\ell^*(S_\ell) = (p_\ell^*, S_\ell)$. The total profit-optimization problem now can be formulated as follows:

$$\max \sum_{\ell \in L} \left( \bar{R}_\ell^*(S_\ell) - \sum_{m \in M} c_{m\ell} x_{m\ell} \right) \quad (14)$$

subject to:

$$\sum_{\ell \in L} x_{m\ell} \leq B_m \quad (15)$$

$$S_\ell = \sum_{m \in M} x_{m\ell} \quad (16)$$

$$x_{m\ell} \geq 0 \quad (17)$$

where $B_m$ is the amount of inventory at FC m. That is, the constraint of Equation (15) determines the upper bound of the inventory delivered from FC m.

In general, allocating greater amount of the inventory to be sold to the customers cannot reduce the revenue as extra inventory can always be left unsold. On the other hand, in order to derive more revenue by selling more inventory within a given time period, the sales price should be lowered, which results in diminishing marginal return of inventory allocation. Mathematically, the second derivative of the optimally-priced revenue as a function of allocated inventory is negative implying that the function is concave. Therefore, after the sign of the objective function of Equation (14) is changed, the optimization problem of Equations (14-17) becomes equivalent to a well-studied min-cost network flow problem with convex costs, with known solutions.

In contrast, embodiments implement a novel algorithm disclosed below ("Algorithm 1") that iteratively solves the Optimal Inventory Allocation problem. Algorithm 1 takes a hyper-parameter $\delta_0$ to determine its initial step length as follows:

Construct an initial feasible solution $x_{m\ell}$ satisfying the constraint of Equation (15)

```
n ← 1
while n < N and termination criteria not satisfied
    δ ← δ₀/n
    obtain f_mℓ as the optimal solution to MCNF(δ)
    x_mℓ ← f_mℓ
    S_ℓ ← Σ_{m∈M} x_mℓ
    b_m ← B_m − Σ_{ℓ∈L} x_mℓ
end while
return x_mℓ
```

At each iteration of Algorithm 1 above, the min-cost network flow problem, MCNF($\delta$), disclosed as follows, is solved. MCNF($\delta$) is solved by defining the critical product allocation amount $\sigma_\ell$ as a solution to the following:

$$\left. \frac{\partial \bar{R}_\ell^*(S_\ell)}{\partial S_\ell} \right|_{\sigma_\ell} = \min_m c_{m\ell} \quad (18)$$

That is, $\sigma_\ell$ can be thought of as the maximal possible allocation of the inventory that can still improve the profit generated by the customer group $\ell$. $\sigma_\ell$ is used to scale the amount of inventory to be allocated to the customer group. Next, the network is designed.

Figure 3:
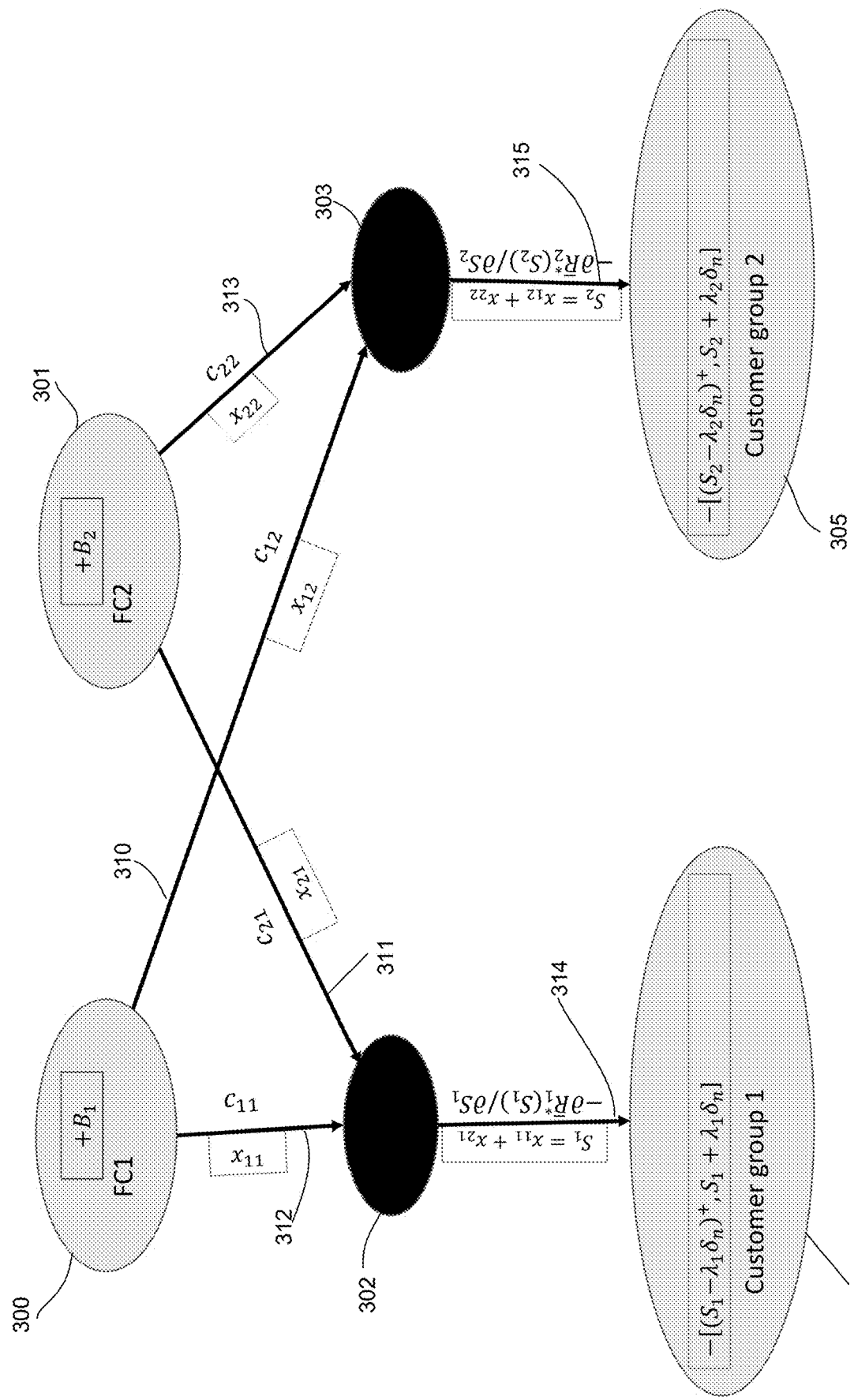
FIG. 3 illustrates a network in accordance to embodiments of the invention that includes three layers of nodes.

FIG. 3 illustrates a network in accordance to embodiments of the invention that includes three layers of nodes. The nodes 300, 301 in the top layer correspond to the FCs. The nodes 304, 305 in the bottom layer correspond to the customer groups. The nodes 302, 303 in the intermediate layer serve to "consolidate" the allocations from the FCs to the customer groups. There are arcs 310-315 connecting each FC node 300, 301 to each customer group node 304, 305 that is reachable from the FC as not all FCs may serve all customer groups. The cost of each arc in this layer is the delivery or service cost of the unit of the product from the FC to the customer group. The network flow problem starts with the current feasible solution $x_{m\ell}$ units of flow in the top arc layer. Consequently, the amount of flow sent from the consolidator nodes 302, 303 to the customer group nodes is $S_\ell = \Sigma_{m \in M} x_{m\ell}$. The cost of the arc from the "consolidator" node to the customer group node is $-\partial \bar{R}_\ell^*(S_\ell)/S_\ell$. Note the negative sign that is used to solve the minimization problem. The top-layer nodes 300, 301 serve as flow sources with capacity $B_m$ (e.g., B1 for node 300). The bottom-layer nodes 304, 305 serve as what is referred to as "sinks" in network flow terminology. The capacity of each sink is set to the interval $[(S_\ell - \sigma_\ell \delta_n)^+, S_\ell + \sigma_\ell \delta_n]$. That is, the flow is feasible but there are constraints to limit the change of the total allocated product for each customer group within progressively tighter boundaries. At each call to the MCNF algorithm (Equation (18)), the new network flow $f_{m\ell}$ is returned that decreases the total cost of the flow in the network thus increasing the total profit. The Optimal Inventory Allocation algorithm (Algorithm 1) terminates when it fails to improve the objective function above a certain threshold or the maximal number of iterations is reached. Known fast polynomial-time algorithms can then be used to solve the min-cost network flow problem.

Disclosed below are certain observations regarding the solution to the problem in accordance to embodiments. Specifically, the cost of an undirected cycle in the directed flow network is defined as the sum of all arc costs with the costs of the arcs traversed in the reversed direction taken with the negative sign. Similar to the terminology from the network simplex method, a network is referred to as "degenerate" if it has a zero-cost cycle. The network degeneracy may occur in practice, for example, when the retailer has flat shipping rates that are the same for all origin-destination pairs. When all shipping costs are the same, in the optimal solution the marginal revenue $\delta \bar{R}_\ell^*(S_\ell)/\delta S_\ell$ is the same for each customer group $S_\ell$. It exceeds the shipping cost when there is no leftover inventory and equal to the shipping cost when there is some unsold inventory left at the end of the life cycle.

When the network is non-degenerate, the links between the top and the middle layers with non-zero flow, that is, with $x_{m\ell} > 0$, cannot form a cycle. For example, in the network shown in FIG. 3, at most three of the four links 310-313 in the top layer can carry positive flow. This can be proven by considering the fact that a non-zero flow cycle will have a positive cost in one of the directions, which means that reducing the flow along this cycle improves the objective function implying the suboptimality of the solution. One implication of this observation is that if the shipping costs are sufficiently different, the number of links between FCs 300, 301 and intermediate consolidating nodes 302, 303 does not exceed |M|+|L|−1. Another observation is that each customer group is supplied from at least one FC. Since by the assumption the demand function stays positive for any price, then for any delivery cost values, there is always a positive (although very low) inventory allocation that can make this allocation profitable. In other words, if there is zero allocation of inventory, a sufficiently small reallocation from another customer group will carry overall positive marginal profit. One implication of this observation and the number of customer groups supplied from two or more FCs is at most one less that the number of FCs.

These properties of the optimal solution in embodiments provide the following:
  Since in many of the supply chain examples the number of FCs is significantly lower than the number of customer groups, additional constraints may need to be imposed on planning the supply to increase its robustness. One such measure could be imposing hard or soft constraints on link capacities.
  Most min cost flow algorithms also compute so-called node potentials, or dual costs, for the nodes with binding supply constraints. One interpretation of the dual cost is the improvement of the objective function per unit of extra supply at the node. This information may be useful when there is an additional opportunity of transporting inventory between the nodes. Usually, it involves a significant fixed cost and the problem becomes what is referred to as the "network design" problem. Its solution may serve as an additional decision tool for planning load balancing between the FCs.

Multiple Customer Groups Served from Multiple FCs with the Price Coefficient Uniformly Distributed For the special case of uniformly distributed price coefficient disclosed above, a closed-form expression for the marginal revenue to be used in Algorithm 1 above can be derived. In order to find the derivative of the revenue-maximizing function of the allocated inventory, $\delta \bar{R}^*_\ell(S_\ell)/\delta S_\ell$, the expression for the optimal price p* from Equation (13) is substituted to Equation (8) for the expected revenue $\bar{R}$ to get the optimal revenue as a function of the allocated inventory S, $\bar{R}^*(S)$ and take its derivative:

$$\frac{\partial \bar{R}(S)}{\partial S} = \begin{cases} \frac{1}{\beta_2}\log\frac{\alpha T}{s} - \frac{\beta_1}{\beta_2}\frac{\log\frac{\beta_2}{\beta_1}}{\beta_2 - \beta_1}, & \text{if } \log\frac{\alpha T}{s} > \beta_1\frac{\log\frac{\beta_2}{\beta_1}}{\beta_2 - \beta_1} \\ 0, & \text{otherwise} \end{cases} \quad (19)$$

Note that when the allocated inventory exceeds the critical threshold $$\alpha T \exp\left(-\beta_1 \frac{\log\frac{\beta_2}{\beta_1}}{\beta_2 - \beta_1}\right),$$

adding more inventory does not affect the optimal markdown revenue.

The Hierarchical Demand Model

Several approaches to estimating the demand model parameters can be used in embodiments. Although the demand modeling can be considered as a general predictive analytics problem, the model must exhibit certain properties, which narrows the choice of the models. The main limitation comes from the fact that the demand is the monotonically decreasing function of the product price, which makes the most commonly used machine learning approaches such as ensemble methods or deep learning neural networks inapplicable. Therefore, embodiments are limited to the main two groups of the parametric methods: discreet choice models based on the Multinomial Logit ("MNL") and regression methods using generalized linear models ("GLM"). The latter includes log-linear, Poisson, and Negative Binomial regressions. In both groups, the prediction is based on a linear function of several attributes including price, seasonality or seasonal time shocks, promotion lifts, and post-promotion fatigue or pantry-loading. The MNL-based methods consider this linear function as the product utility and predict demand as a market share. Their common disadvantage is the dependency on the estimation of the so-called no-purchase option coefficient, which is usually an unobservable variable. On the other hand, these methods account for the demand transference among similar products and have superior performance for the categories of products with high substitutability. The GLM-based methods usually do not explicitly model the demand transference. However, recently known models can account for the presence of the similar products and their demand cannibalization effects using the similarities of their customer attributes such as brand, color, size, etc.

The main hurdle in applying these methods to predict the sales of a particular item at a particular store or by a specific customer group is that most of these sales are very low volume and thus have a very low signal-to-noise ratio. In addition, the price changes may be very infrequent and in a very small range, which makes the estimation of the price sensitivity even more difficult. Further, the sales history of an individual item may contain the number of observations too low to provide sufficient statistical power for the estimation of several parameters. All these factors make parameter estimation very unreliable when it is based on the data from the sales of an isolated item. It can, however, be mitigated by considering multiple items sharing similar parameters or the same item sold at different locations. As locations and merchandise items usually form a certain hierarchy coming from the entire chain down to price zones and individual stores when the location hierarchy is considered and to departments, categories, classes and individual items for the merchandise hierarchy. This hierarchy coupled with clustering the items at the lower level of the merchandise classification provides a convenient tool for estimating the demand model parameters at the levels of the hierarchy with the sufficient statistical power. Known approaches provide a methodology to determine at which level each parameter is estimated in addition to building clusters of similar items for the parameter estimation.

Embodiments build estimation methods taking advantage of the existing hierarchical structure as well as the clusters built for the estimation purposes. The output of the methods is the probability distributions of some of the parameter estimates.

The Demand Model

Assumptions

Embodiments assume the availability of the general sales data aggregated over a short time period like a day or week rather than transaction-level data reflecting individual purchases (i.e., historical sales data). That is, it is assumed that for each item i there are observations from historic sales data that consist of triples ($s_{it}$, $p_{it}$, $r_{it}$) representing, respectively, sales, price, and a binary promotion flag for the dated time period t. In many cases, zero sales are not part of the data and in addition to that the out-of-stock ("OOS") periods are not clearly flagged. The combination of these two factors makes it impossible to distinguish between the zero demand and OOS observations. In addition, sometimes promotions are not clearly marked or there could be several types of promotions with different promotion lifts marked by the same flag. Embodiments can uses a heuristic, disclosed below, to distinguish among these cases.

It is also assumed that the merchandise hierarchy is known and adequately reflects the similarity between the retail items. Further, multiple items with varying magnitude of demand and prices can be pooled together. It is assumed that textual descriptions of the items in the historical sales data are present from which it is possible to extract attributes.

Attributes of the Demand Model

The following is a description of the attributes together with the demand output variable and how they are used by the model. Also described are some pre-processing procedures that are carried out to form an observation pool at a higher levels of the hierarchy. The notation $x_i(t)$ is used to denote the value of variable x observed for product i at time t.

demand: Since multiple items that are pooled together may exhibit similar behavior but have different mean demand (e.g., for the same item at different stores), it is necessary to estimate the so-called base demand, which can be either approximated by the mean demand if the item price changes are not significant or estimated as an intercept-type constant.

Since for the slow-moving products it is not possible to distinguish between zero-demand periods and unavailability of the product when the zero-inventory periods are not reliably identified in the data or appear as missing data, embodiment consider the sufficiently long sequences of the missing or zero-sales periods as OOS. The length threshold is determined by the probability threshold of encountering a certain number of consecutive zero-demand periods, which is computed as $$N_{thresh} = -\frac{\log p_{thresh}}{\lambda}$$

where $\lambda$ is the parameter of the Poisson distribution. Since the observed demand $d_i(t)$ is effectively zero-truncated, the maximum likelihood estimator of the parameter $\lambda$ is obtained from solving the following:

$$\frac{\lambda}{1-e^{-\lambda}} = \bar{d}_i$$

where $\bar{d}_i$ is the sample mean of the observed demand for product i. The threshold probability value is usually selected to be in the order of 0.01, meaning that the probability that a sequence of zero-demand periods with the length exceeding the threshold due to zero demand does not exceed 1%. For example, if the sample mean of the observed zero-truncated demand is 2.3, then the estimated mean demand is about 2, which means that the probability of zero demand in three or more consecutive periods is below 1%. Therefore, it is reasonable to assume that these would be the OOS periods.

price: In order to pool together similar merchandise items with different prices such as different size packages of the same product, their price values are replaced with relative deviation from the average or initial non-discounted price:

$$\tilde{p}_i = \frac{p}{p_0} - 1.$$

The estimated coefficient of this variable is the price elasticity of demand when the demand is modeled as exponentially dependent on price.

promotion flag: As promotions come in various kinds and flavors, there should ideally be a vector of promotion flags reflecting which campaigns were run and which promotion tools were used in each case. However, very few retailers keep historical records of the promotions. Sometimes, there are no promotion indicators at all. In this case, promotion and regular sales can be separated by running a clustering algorithm in price-demand space. Embodiments denote the promotion flag variable as $r_i(t)$.

post-promotion: This is the well-known effect caused by the so-called promotion fatigue and pantry loading leads to sales dip following the promotion period. This variable is defined as 0-1, or Boolean, indicating whether there was a promotion in the previous week.

similarity: This is the set of variables reflecting how much demand for this item is cannibalized by other item and their prices in the current assortment. Embodiments define two variables, one for the total of the assortment item similarity, the other for the total of item prices weighted by their similarity. The latter reflects the competitive effect of the prices of the other items. The similarity between the items is computed based on the item attributes extracted from their textual descriptions. Embodiments denote the similarity and price similarity variables as $u_i(t)$ and $v_i(t)$, respectively.

seasonality: As the timing of the most peak sales periods is determined by annual holidays, some of which follow lunar rather than solar calendar (e.g., Easter), while the others may fall on different days of each year (e.g., Thanksgiving), the corresponding periods are marked by the holiday occurrence rather than calendar dates. In addition, in most cases the peak sales happen in the weeks preceding the holidays and the holiday and post-holiday periods are characterized by the drops in sales. Therefore, embodiments define seasonality variables for three weeks per each holiday. Assuming each holiday-related week is indexed by its index h, embodiments define a set of dummy variables $w_h(t)$ indicating whether period t is the time period associated with the holiday.

Embodiments denote the vector of the explanatory variables as follows:

$$\vec{x}_i(t)=(1,\tilde{p}_i(t),r_i(t),r_i(t-1),u_i(t),v_i(t),\{w_h(t)|h\in H\}) \quad (20)$$

and the vector of the coefficients as follows:

$$\vec{\beta}_i=(\beta_i^0,\beta^{price},\beta^{promo},\beta^{postPromo},\beta^{sim},\beta^{priceSim},\{\beta_h^{holiday}(t)|h\in H\}) \quad (21)$$

Note that only base demand coefficient $\beta_i^0$ is specific to product i.

If the demand is modeled as Poisson distribution with the mean:

$$\lambda_i(t)=E(d_i(t)|x_i(t))=e^{\vec{\beta}'_i\vec{x}_i(t)} \quad (22)$$

Then the probability mass function is given by:

$$p\left(d_i(t)\,|\,\vec{x}_i(t);\vec{\beta}_i\right) = \frac{\lambda_i(t)^{d_i(t)}}{d_1(t)!}e^{-\lambda_i(t)}$$

Given a series of T observations $(d_i(t), x_i(t))$, t=1, ..., T, for product set M, embodiments use the regularized regression to find the estimate of the $\beta$ coefficients by maximizing the difference between the logarithm of the likelihood and the regularization term:

$$l(\beta) = \sum_{i\in M}\sum_{t=1}^T \left(d_i(t)\vec{\beta}'_i\vec{x}_i(t) - e^{\vec{\beta}'_i\vec{x}_i(t)}\right) - \frac{T|M|}{2}\alpha\|\vec{\beta}_i\|_2^2 \quad (23)$$

where $\alpha$ is the regularization penalty parameter estimated via cross-validation. This technique, similar to ridge regression, can reduce overfitting.

Since the log-likelihood function is concave, the Newton-Raphson method can be applied to find the maximum likelihood estimator ("MLE") of $\vec{\beta}_i$. There are multiple known solutions to compute this MLE.

In cases when the mean demand $\bar{d}_i$ is easy to estimate for each product from the sales data, it can be entered into Equation 22 as exposure:

$$\lambda_i(t)=E(d_i(t)|x_i(t))=\bar{d}_i e^{\vec{\beta}'\vec{x}_i(t)}$$

In this case, the estimated coefficient vector $\vec{\beta}$ defined in Equation 21 becomes:

$$\vec{\beta}=(\beta^{price},\beta^{promo},\beta^{postPromo},\beta^{sim},\beta^{priceSim},\{\beta_h^{holiday}(t)|h\in H\})$$

and becomes the same for all products. The variable vector defined in Equation 20 becomes:

$$\vec{x}_i(t)=(\tilde{p}_i(t),r_i(t),r_i(t-1),u_i(t),v_i(t),w_h(t)|h\in H)$$

Therefore the number of estimated parameters is reduced by |M|.

Hierarchical Estimation

Embodiments use a hierarchical approach to estimating the coefficients of the demand model defined above. Assume there are at least three levels of the hierarchy: category (about 100-1,000 individual SKU/UPC items), class (about 10-100 items) and individual items that may include several SKU/UPC of varying size/color but of the same style. The terminology may differ among retailers but this hierarchy is almost always present. Most of the demand model coefficients are estimated at the class level except for the base demand $\beta^0$, which is estimated at the item level. The price elasticity is also estimated at the class level except for the classes with strong seasonality. For those classes, the post-seasonal drop in the demand often coincides with significant price discounts to the extent of a positive correlation between price and demand changes, which may result in the positive sign of the estimated price coefficient. This is a well-known endogeneity effect when correlation exists between an explanatory variable and the error term (or unobserved factors) in a model. Several known solutions have been proposed for its correction (e.g., solutions for automobile prices and for airline prices). However, each of these and other approaches depends on the availability of the so-called instrumental variables and requires specific knowledge of product characteristics, which are not always available. Instead, embodiments estimate the price elasticity using other products from the same category that do not exhibit strong seasonality or if necessary go even higher in the hierarchy tree.

Uncertainty Estimation

Embodiments use two methods to estimate the parameter uncertainty based on "Hessian" at the maximum of the log-likelihood function and using the Markov Chain Monte-Carlo ("MCMC") method.

Hessian-based: Since the Newton-Raphson method effectively approximates the log-likelihood function as a paraboloid with its shape determined by the Hessian of the function, the variance of the parameter estimations can be computed as the negative of their diagonal elements in the inverse of the Hessian, which provides the means for building the confidence interval by assuming the normal distribution around the estimation. For example, the 95%-confidence interval can be found as $$\hat{\beta}^j \pm 1.96\sqrt{-H_{jj}^{-1}}$$

where $\hat{\beta}^j$ is the MLE for the j-th parameter and $H_{jj}$ is the j-th diagonal element of the Hessian. After that, the probability distribution can be modeled as normal with $(\hat{\beta}^j, \sqrt{-H_{jj}^{-1}})$ parameters or uniform distribution for better tractability.

MCMC-based: Embodiments utilize Markov Chain Monte Carlo ("MCMC") sampling. The samples are drawn from a prior distribution with the distribution of the next sample dependent on the last sample to form a Markov chain that converges to the posterior distribution $g(\vec{\beta}\,|d_i(t), \vec{x}_i(t), t=1, \ldots, T, i\in M)$. At the higher hierarchy level the parameters are estimated using an uninformative prior distribution. At the lower levels, the prior distribution is the posterior from the higher level. The posterior distribution at the item level is used to model the parameter uncertainty.

From the practical implementation perspective, these two methods have their advantages and disadvantages. Newton-Raphson MLE methods may be relatively fast but computationally unstable whereas MCMC-type methods are usually stable but may be computationally slow especially for large samples. In some practical implementations it may be beneficial to use a hybrid approach by applying Newton-Raphson methods at the higher hierarchy levels and MCMC at the item level with Gaussian prior obtained from the resulting Hessian at the higher level.

Figure 4:
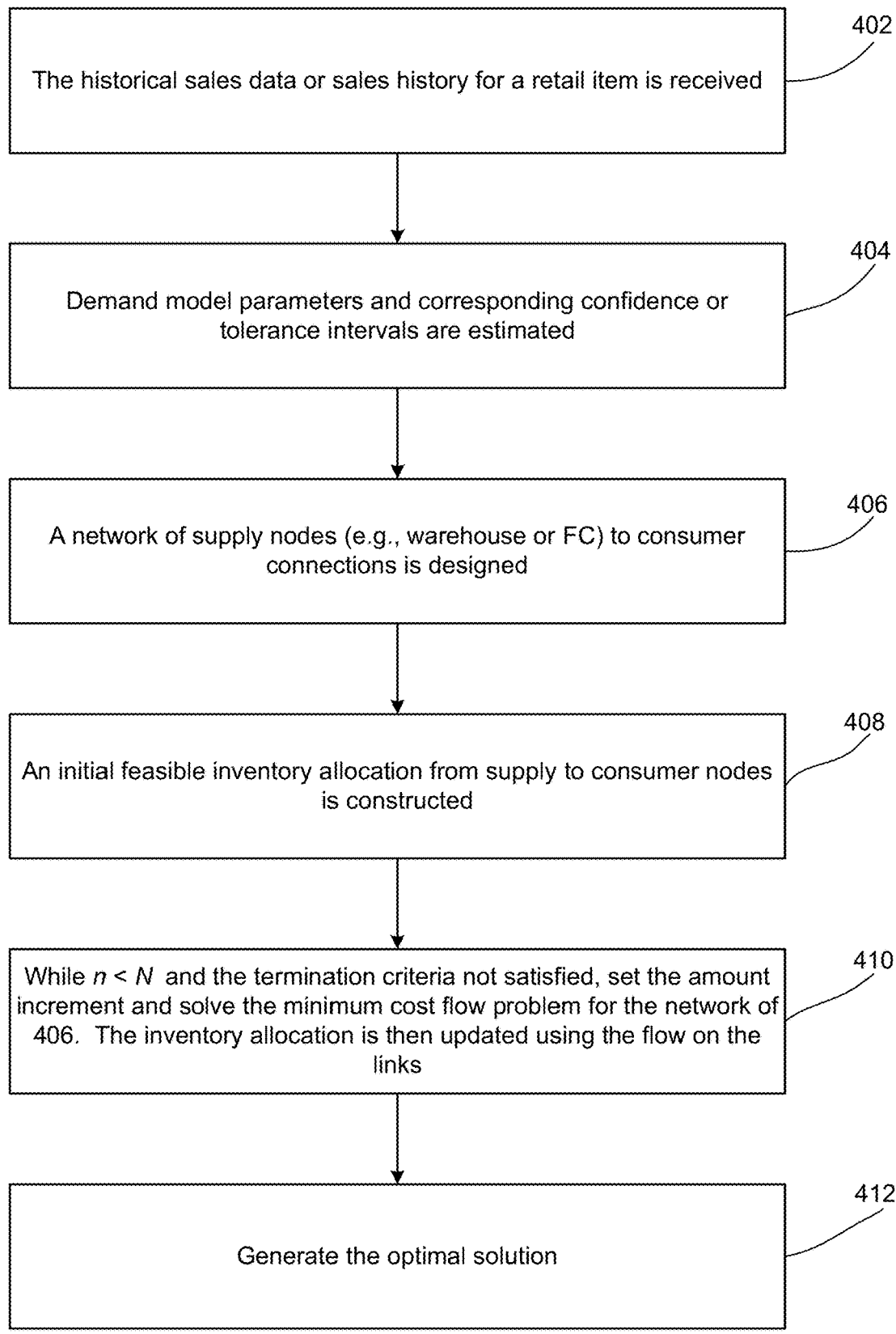
FIG. 4 is a flow diagram of the functionality of the inventory and price optimization module of FIG. 2 in accordance with one embodiment.

FIG. 4 is a flow diagram of the functionality of inventory and price optimization module 16 of FIG. 2 in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In one embodiment, the functionality of FIG. 4 controls an amount of inventory (e.g., for an item at a single store) to be electronically ordered by a computerized inventory system (e.g., by a computerized inventory management and demand forecasting system). The functionality of FIG. 4 may also control an amount of inventory (e.g., for an item at a single store) to be allocated by the computerized inventory system. The functionality of FIG. 4 may further control adjustment of an amount inventory (e.g., for an item at a single store) by the computerized inventory system.

At 402, the historical sales data or sales history for a retail item for which optimized price and inventory allocation is to be determined is received. The retail item is shipped from multiple possible warehouses/fulfillment centers (i.e., supply nodes) to multiple possible customer groups/retail stores (i.e., receiving nodes). In one embodiment, the item is a limited life span item. The sales histories of similar items is also received in embodiments in order to capture demand transferring effects and infer parameter estimation when the sales history of the given item is not complete.

In one embodiment, the sales history for the item is the weekly or daily sales data over a longer period of time, such as 3-months to a year, and is at the SKU/store level. In other embodiments, the historical sales data is sales transaction data aggregated over short time periods such as weeks or days. It is assumed that for each item i there are observations from historic sales data that consist of triples ($s_{it}$, $p_{it}$, $r_{it}$) representing, respectively, sales, price, and a binary promotion flag for the dated time period t. In many cases, zero sales are not part of the data and in addition to that the out-of-stock (OOS) periods are not clearly flagged.

At 404, demand model parameters and corresponding confidence or tolerance intervals are estimated. In one embodiment, the estimated parameters include price elasticity or general price sensitivity coefficient, promotion lift effect, post-promotion fatigue effect, similarity to other products and seasonality coefficients. For each parameter, a parameter uncertainty is estimated. In one embodiment, a Hessian-based confidence interval is used as the parameter uncertainty measure. In one embodiment, an MCMC-based parameter uncertainty is computed as a tolerance interval based on the observed variance of the underlying Markov Chain. Therefore, embodiments use a confidence interval when the Hessian can be computed and a tolerance interval when using the MCMC approach.

At 406, a network of supply nodes (e.g., warehouse or FC) to consumer connections is designed (e.g., the network shown in FIG. 3). The network includes three layers of nodes: upper, intermediate, and lower. The nodes in the upper layer (e.g., nodes 300, 301 of FIG. 3), referred to as "supply nodes", correspond to the FCs while intermediate level nodes (e.g., nodes 302, 303 of FIG. 3) and lower level nodes (e.g., nodes 304, 305 of FIG. 3) correspond to the customer groups. Each node in the upper layer is connected by a link (e.g. links 310, 311, 312, 313 of FIG. 3) to each node in the intermediate layer if the supply from the corresponding FC can be used to satisfy the demand at the corresponding customer group. Further, each node in the intermediate layer (i.e., an "imaginary" node) is connected by a link (e.g., links 314 and 315 of FIG. 3) to the lower layer-node of the same customer group. Therefore, in embodiments, there is always a one-to-one relationship between the intermediate nodes and the customer group nodes.

At 408, an initial feasible inventory allocation from supply to consumer nodes is constructed. Despite the fact that the allocated inventory is for the entire lifecycle of the item, it does not have to be immediately physically delivered to the customer groups. Instead, it is used as an input to computing the optimal price and marginal revenue at the customer group $\ell$. The initial feasible solution $x_{m\ell}$ satisfies the constraint of Equation (15) above, where $x_{m\ell}$ is an amount of inventory allocated from each FC m to customer group $\ell$. For example, using the distribution network example of FIG. 3 and assuming each of the FCs contains 100 units of a specific flash memory card that has to be sold within the next 13 weeks, then the computations can start with 50 units of this item allocated from each of the FCs to each customer group. For the 100 units of initial allocation to each of the consumer groups, embodiments determine their optimal prices and marginal revenue, that is, the increase of the revenue per each additional unit computed according to Equation (19) to be used as the flow cost on the links from intermediate to the lower-level nodes.

At 410, while n<N and the termination criteria not satisfied, set the amount increment step $\delta_n = \delta_0/n$ and solve the minimum cost flow problem for the network of 406 using, for example, Algorithm 1 disclosed above. The inventory allocation is then updated using the flow on the links. Algorithm 1 executes for a predetermined number of steps (denoted by N) but can also terminate earlier when the improvement of the objective function between the steps falls below certain threshold.

At 412, the optimal solution is obtained and reported. The optimal solution includes the recommended inventory allocations and sales prices at the customer groups. Continuing with the above example, the optimal inventory allocation could be the following: 100 units from FC1 to the customer group 1; 20 units from FC2 to customer group 1; 50 units from FC2 to customer group 2. The price at the consumer group 1 is $8 and the consumer group 2 is $9. Note that in this example 30 units at FC2 are unsold as marginal revenues at both consumer groups are approximately the same as the respective per-unit delivery costs to the groups from the FC2. Thus, allocating each additional unit of inventory would result in profit loss.

As a result of embodiments of the invention, some inventory at a warehouse will be reallocated from one customer group to another. This may be a "virtual" reallocation as the inventory may not have yet been sent to the respective price zone. However, the outcome of the functionality of FIG. 4 will be some inventory being sent to a customer group or price zone that otherwise would be been sent to another customer group. As a result, logistic systems and inventory management systems at each warehouse will cause some inventory to be sent using a transportation mechanism such as a truck. The entire process can be automated with automated transportation such as self-driving trucks, automatic truck loading machines, etc., all responding to electronic signals from system 10 of FIG. 2.

As disclosed, embodiments compensate for parameter uncertainty in generating a practically applicable prescriptive solution based on a parametric predictive model since in most applications it is impossible to obtain a sufficiently precise estimator of the model parameters. Together with a new formulation of joint markdown and distribution optimization problem based on accounting for the uncertainty of the demand parameters rather than stochastic demand fluctuations, embodiments are directed to a novel solution approach that can be readily implemented by a wide variety of retail chain operators offering products of a limited lifespan.

Embodiments disclose a network flow optimization model that can be used as a decision-making tool to provide additional managerial insight in the situations when the retailer can benefit from additional one-time actions like load balancing between the FCs by transporting large quantities of inventory at fixed cost or improving the fault-tolerance of the supply chain between the FCs and the retail locations by increasing the density of the connections.

Embodiments optimize the retail price markdown recommendation when the demand model parameters are not known exactly, which is generally the case when the demand parameters are estimated based on the historic sales data. Embodiments further apply when a retailer has multiple warehouses or fulfillment centers from which it has to supply the product item to multiple locations or customer groups with different demand parameters, especially price sensitivity.

Embodiments solve a markdown-pricing optimization problem under parameter uncertainty. Embodiments assume that a retailer is capable of price differentiation among multiple customer groups with different demand parameters. These groups can generally be supplied from multiple warehouses or fulfillment centers at different costs. As is common in the markdown phase of the retail item lifecycle, the retailer is assumed to have a limited amount of inventory at each warehouse that must be sold by a certain exit date with no more additional replenishments of the inventory. The objective of embodiments is to maximize the gross profit, defined as the total revenue minus total cost.

Since in most practical situations the demand parameters cannot be estimated exactly, embodiments optimize the expected value of the profit based on the given distribution of the demand parameters. In the case of the general demand model and general distribution of the demand parameters, embodiments provide a framework for finding the optimal pricing policy as the one with the greatest expected value of the total profit. Embodiments can further be effectively implemented if there is a computationally tractable procedure for computing the derivative of the optimal expected revenue as a function of the inventory allocated to each customer group. The problem is then reduced to a well-known min-cost network flow with convex arc costs that can be solved in a relatively small number of iterations.

Embodiments also include a closed-form solution in case of log-linear demand model and uniform distribution of the price elasticity parameter when there is a single customer group supplied from a single warehouse. When there are multiple customer groups supplied from multiple warehouses, embodiments provide a closed-form expression for the arc costs and their derivatives in the min-cost network-flow formulation, which allows for the fast solution of the problem.

Embodiments provide a novel approach to solving the markdown problem, by considering the uncertainty of the parameters. Embodiments provide a novel closed-form solution for the basic formulation with a log-linear demand model and uniform price elasticity parameter distribution when there is a single customer group (e.g., a brick-and-mortar store), and no shipping and handling costs. Embodiments provide for a natural generalization in the case when there are multiple customer groups supplied from multiple warehouses by reducing the problem to iteratively solving a min-cost network flow problem.

Embodiments overcome an asymmetry in known solutions in the outcome of the markdown process due to the inherent inaccuracy in the price elasticity estimation. Namely, if the price elasticity is overestimated and as a consequence the markdown price is set too low, then the retailer ends up with out-of-stock situation before the end of the sales season, which results in lost revenue. In the opposite situation of setting the price too high, the retailer ends up with some unsold inventory but also with lower revenue loss. Therefore, conventional wisdom is to markdown at a lower rate than would be based on the mean value of the estimated parameter. Embodiments, in contrast, provide a quantification tool to determine an optimized markdown price recommendation.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of inventory allocation of a retail item, wherein the retail item is allocated from a plurality of different fulfillment centers to a plurality of different customer groups, the method, implemented by one or more processors, comprising:

receiving, by the one or more processors, historical sales data for the retail item comprising past transaction data for the retail item received from a database;

estimating, by the one or more processors, demand model parameters comprising one or more of: price elasticity, promotion lift effect, post-promotion fatigue effect, similarity to other products, or seasonality coefficients;

generating, by the one or more processors, a network comprising first nodes, each first node corresponding to one of the fulfillment centers (FC m), second nodes, each second node corresponding to one of the customer groups ($\ell$), third nodes, each third node between one of the first nodes and one of the second nodes, each of the third nodes consolidating allocations between the corresponding first node and second node, and a plurality of arcs connecting each fulfillment center to each customer group that is reachable from the corresponding fulfillment center;

generating, by the one or more processors, an initial feasible inventory allocation ($x_m \ell$) from the first nodes to the second nodes, where each feasible inventory allocation comprises an amount of inventory allocated from each FC m to each $\ell$ such that $\Sigma \ell_{\in L} X_m \ell \leq B_m$, where $B_m$ comprises an amount of inventory at FC m;

generating, by the one or more processors, the inventory allocation $x_m \ell$ using a hyper-parameter $\delta_0$ to determine its initial step length comprising:

--- n ← 1
while n < N and a termination criteria is not satisfied
　δ ← δ₀/n
　obtain $f_{m\ell}$ as an optimal solution to MCNF(δ)
　$x_{m\ell} \leftarrow f_{m\ell}$
　$S_\ell \leftarrow \Sigma_{m \in M} x_{m\ell}$
　$b_m \leftarrow B_m - \Sigma_{\ell \in L} x_{m\ell}$
end while
return $x_{m\ell}$

--- wherein there are M fulfillment centers serving L customer groups, at each fulfillment center m, for each customer group $\ell$ there is initial product inventory $S_m$, $B_m$ is the amount of inventory at FC m;

in response to the generated inventory allocation, generating, by the one or more processors, an electronic inventory allocation signal that is transmitted to an inventory allocation system; and in response to the inventory allocation signal, automatically causing, by the one or more processors, a first amount of the retail item to be moved using an automated transportation mechanism from a first fulfillment center to a first customer group.

2. The method of claim 1, further comprising estimating, by the one or more processors, corresponding confidence or tolerance intervals for the estimated demand model parameters.

3. The method of claim 1, the generating the network comprising:
connecting each of the first nodes to each of the third nodes when a supply from a corresponding fulfillment center can satisfy a demand at a corresponding customer group.

4. The method of claim 1, wherein MCNF($\delta$) comprises:

$$\left.\frac{\partial R_\ell^*(S_\ell)}{\partial S_\ell}\right|_{\sigma_\ell} = \min_m c_{m\ell},$$

where product allocation amount $\sigma\ell$ is used to scale an amount of inventory to be allocated to a customer group for optimal expected revenue $\overline{R}\ell^*(S\ell)=\overline{R}(p\ell^*,S\ell)$ and unit delivery cost to the customer group $\ell$ from fulfillment center m is $c_m\ell$.

5. The method of claim 1, further comprising generating, by the one or more processors, an optimized pricing for the item, wherein the inventory allocation and optimized pricing optimizes profits for the item.

6. The method of claim 1, wherein a cost of each arc from each third node to each second node comprises $-\partial\hat{R}\ell^*(S\ell)/\partial S\ell$.

7. The method of claim 6, wherein a capacity of each third node comprises an interval $[(S\ell-\sigma\ell\delta_n)^+, S\ell+\sigma\ell\delta_n]$.

8. A non-transitory computer-readable medium having instructions stored thereon, when executed by one or more processors, cause the processors to determine inventory allocation of a retail item, wherein the retail item is allocated from a plurality of different fulfillment centers to a plurality of different customer groups, the determining inventory allocation comprising:
receiving, by the one or more processors, historical sales data for the retail item comprising past transaction data for the retail item received from a database;
estimating, by the one or more processors, demand model parameters comprising one or more of: price elasticity, promotion lift effect, post-promotion fatigue effect, similarity to other products, or seasonality coefficients;
generating, by the one or more processors, a network comprising first nodes, each first node corresponding to one of the fulfillment centers (FC m), second nodes, each second node corresponding to one of the customer groups ($\ell$), third nodes, each third node between one of the first nodes and one of the second nodes, each of the third nodes consolidating allocations between the corresponding first node and second node, and a plurality of arcs connecting each fulfillment center to each customer group that is reachable from the corresponding fulfillment center;

generating, by the one or more processors, an initial feasible inventory allocation ($x_m\ell$) from the first nodes to the second nodes, where each feasible inventory allocation comprises an amount of inventory allocated from each FC m to each $\ell$ such that $\Sigma\ell_{\in L} X_m\ell \leq B_m$, where $B_m$ comprises an amount of inventory at FC m;

generating, by the one or more processors, the inventory allocation $x_m\ell$ using a hyper-parameter $\delta_0$ to determine its initial step length comprising:

--- n ← 1
while n < N and a termination criteria is not satisfied
   $\delta \leftarrow \delta_0/n$
   obtain $f_{m\ell}$ as an optimal solution to MCNF($\delta$)
   $x_{m\ell} \leftarrow f_{m\ell}$
   $S_\ell \leftarrow \Sigma_{m \in M} x_{m\ell}$
   $b_m \leftarrow B_m - \Sigma_{\ell \in L} x_{m\ell}$
end while
return $x_{m\ell}$

--- wherein there are M fulfillment centers serving L customer groups, at each fulfillment center m, for each customer group $\ell$ there is initial product inventory $S_m$, $B_m$ is the amount of inventory at FC m;

in response to the generated inventory allocation, generating, by the one or more processors, an electronic inventory allocation signal that is transmitted to an inventory allocation system; and in response to the inventory allocation signal, automatically causing, by the one or more processors, a first amount of the retail item to be moved using an automated transportation mechanism from a first fulfillment center to a first customer group.

9. The computer-readable medium of claim 8, the determining inventory allocation further comprising estimating, by the one or more processors, corresponding confidence or tolerance intervals for the estimated demand model parameters.

10. The computer-readable medium of claim 8, the generating the network comprising:
connecting each of the first nodes to each of the third nodes when a supply from a corresponding fulfillment center can satisfy a demand at a corresponding customer group.

11. The computer-readable medium of claim 8, wherein MCNF($\delta$) comprises:

$$\left.\frac{\partial R_\ell^*(S_\ell)}{\partial S_\ell}\right|_{\sigma_\ell} = \min_m c_{m\ell},$$

where product allocation amount $\sigma\ell$ is used to scale an amount of inventory to be allocated to a customer group for optimal expected revenue $\overline{R}\ell^*(S\ell)=\overline{R}(p\ell^*,S\ell)$ and unit delivery cost to the customer group $\ell$ from fulfillment center m is $c_m\ell$.

12. The computer-readable medium of claim 8, further comprising generating, by the one or more processors, an optimized pricing for the item, wherein the inventory allocation and optimized pricing optimizes profits for the item.

13. The computer-readable medium of claim 8, wherein a cost of each arc from each third node to each second node comprises $-\partial\overline{R}\ell^*(S\ell)/\partial S\ell$.

14. The computer-readable medium of claim 13, wherein a capacity of each third node comprises an interval $[(S\ell-\sigma\ell\delta_n)^+, S\ell+\sigma\ell\delta_n]$.

15. A system for determining inventory allocation of a retail item, wherein the retail item is allocated from a plurality of different fulfillment centers to a plurality of different customer groups, the system comprising one or more processors and a storage device that stores instructions that when executed by the one or more processors performs the inventory allocation comprising:

receiving, by the one or more processors, historical sales data for the retail item comprising past transaction data for the retail item received from a database;

estimating, by the one or more processors, demand model parameters comprising one or more of: price elasticity, promotion lift effect, post-promotion fatigue effect, similarity to other products, or seasonality coefficients;

generating, by the one or more processors, a network comprising first nodes, each first node corresponding to one of the fulfillment centers (FC m), second nodes, each second node corresponding to one of the customer groups ($\ell$), third nodes, each third node between one of the first nodes and one of the second nodes, each of the third nodes consolidating allocations between the corresponding first node and second node, and a plurality of arcs connecting each fulfillment center to each customer group that is reachable from the corresponding fulfillment center;

generating, by the one or more processors, an initial feasible inventory allocation ($x_m\ell$) from the first nodes to the second nodes, where each feasible inventory allocation comprises an amount of inventory allocated from each FC m to each $\ell$ such that $\Sigma\ell_{\in L}, X_m\ell \leq B_m$, where $B_m$ comprises an amount of inventory at FC m;

generating, by the one or more processors, the inventory allocation $x_m\ell$ using a hyper-parameter $\delta_0$ to determine its initial step length comprising:

n ← 1
   while n < N and a termination criteria is not satisfied
     δ ← δ₀/n
     obtain $f_{m\ell}$ as an optimal solution to MCNF(δ)

$x_{m\ell} \leftarrow f_{m\ell}$
   $S_\ell \leftarrow \Sigma_{m \in M} x_{m\ell}$
   $b_m \leftarrow B_m - \Sigma_{\ell \in L} x_{m\ell}$
   end while
   return $x_{m\ell}$ wherein there are M fulfillment centers serving L customer groups, at each fulfillment center m, for each customer group $\ell$ there is initial product inventory $S_m$, $B_m$ is the amount of inventory at FC m;

in response to the generated inventory allocation, generating, by the one or more processors, an electronic inventory allocation signal that is transmitted to an inventory allocation system; and in response to the inventory allocation signal, automatically causing, by the one or more processors, a first amount of the retail item to be moved using an automated transportation mechanism from a first fulfillment center to a first customer group.

16. The system of claim 15, further comprising estimating, by the one or more processors, corresponding confidence or tolerance intervals for the estimated demand model parameters.

17. The system of claim 15, the generating the network comprising:
   connecting each of the first nodes to each of the third nodes when a supply from a corresponding fulfillment center can satisfy a demand at a corresponding customer group.

18. The system of claim 15, wherein MCNF(δ) comprises:

$$\left.\frac{\partial \overline{R}^*_\ell(S_\ell)}{\partial S_\ell}\right|_{\sigma_\ell} = \min_m c_{m\ell},$$

where product allocation amount $\sigma\ell$ is used to scale an amount of inventory to be allocated to a customer group for optimal expected revenue $\overline{R}\ell^*(S\ell)=\overline{R}(p\ell^*, S\ell)$ and unit delivery cost to the customer group $\ell$ from fulfillment center m is $c_m\ell$.

19. The system of claim 15, further comprising generating, by the one or more processors, an optimized pricing for the item, wherein the inventory allocation and optimized pricing optimizes profits for the item.

* * * * *

UNITED STATES PATENT AND TRADEMARK OFFICE
CERTIFICATE OF CORRECTION

PATENT NO. : 11,704,611 B2
APPLICATION NO. : 17/231252
DATED : July 18, 2023
INVENTOR(S) : Vakhutinsky It is certified that error appears in the above-identified patent and that said Letters Patent is hereby corrected as shown below:

In the Specification

In Column 12, Line 33, delete "$S_\ell$." and insert -- $\partial S_\ell$. --, therefor.

In the Claims

In Column 22, Line 47, in Claim 1, delete "$(x_m\ell)$" and insert -- $(x_{m\ell})$ --, therefor.

In Column 22, Line 50, in Claim 1, delete "$\Sigma\ell \in_L X_m\ell \leq B_m$," and insert -- $\sum_{\ell \in L} x_{m\ell} \leq B_m,$ --, therefor.

In Column 22, Line 53, in Claim 1, delete "$x_m\ell$" and insert -- $x_{m\ell}$ --, therefor.

In Column 23, Line 29, in Claim 4, delete "$\sigma\ell$" and insert -- $\sigma_\ell$ --, therefor.

In Column 23, Lines 31-32, in Claim 4, delete "$\tilde{R}\ell^*(S\ell)=\tilde{R}(p\ell^*,S\ell)$" and insert -- $\tilde{R}_\ell^*(S_\ell) = \tilde{R}(p_\ell^*, S_\ell)$ --, therefor.

In Column 23, Line 33, in Claim 4, delete "$c_m\ell$." and insert -- $c_{m\ell}$. --, therefor.

In Column 23, Lines 39-40, in Claim 6, delete "$-\partial \tilde{R}\ell^*(S\ell)/\partial S\ell$," and insert -- $-\partial \tilde{R}_\ell^*(S_\ell)/\partial S_\ell$ --, therefor.

In Column 23, Line 42, in Claim 7, delete "$[(S\ell -\sigma\ell \delta_n)^+, S\ell+\sigma\ell \delta_n]$." and insert -- $[(S_\ell - \sigma_\ell \delta_n)^+, S_\ell + \sigma_\ell \delta_n]$. --, therefor.

Signed and Sealed this
Fourth Day of June, 2024

Katherine Kelly Vidal
*Director of the United States Patent and Trademark Office*

CERTIFICATE OF CORRECTION (continued)
U.S. Pat. No. 11,704,611 B2

In Column 24, Line 2, in Claim 8, delete "$(x_m\ell)$" and insert -- $(x_{m\ell})$ --, therefor.

In Column 24, Line 5, in Claim 8, delete "$\Sigma \ell \in_L X_m \ell \leq B_m,$" and insert -- $\sum_{\ell \in L} x_{m\ell} \leq B_m,$ --, therefor.

In Column 24, Line 8, in Claim 8, delete "$x_m\ell$" and insert -- $x_{m\ell}$ --, therefor.

In Column 24, Line 55, in Claim 11, delete "$\sigma\ell$" and insert -- $\sigma_\ell$ --, therefor.

In Column 24, Lines 57-58, in Claim 11, delete " $R\ell^*(S\ell)=\bar{R}(p\ell^*,S\ell)$ " and insert -- $\bar{R}_\ell^*(S_\ell) = \bar{R}(p_\ell^*, S_\ell)$ --, therefor.

In Column 24, Line 59, in Claim 11, delete "$c_m\ell.$" and insert -- $c_{m\ell}.$ --, therefor.

In Column 24, Line 67, in Claim 13, delete " $-\partial R\ell^*(S\ell)/\partial S\ell.$ " and insert -- $-\partial \bar{R}_\ell^*(S_\ell)/\partial S_\ell.$ --, therefor.

In Column 25, Line 2-3, in Claim 14, delete "$[(S\ell - \sigma\ell\, \delta_n)^+, S\ell + \sigma\ell\, \delta_n].$" and insert -- $[(S\ell - \sigma_\ell \delta_n)^+, S_\ell + \sigma_\ell \delta_n].$ --, therefor.

In Column 25, Line 33, in Claim 15, delete "$(x_m\ell)$" and insert -- $(x_{m\ell})$ --, therefor.

In Column 25, Line 36, in Claim 15, delete "$\Sigma \ell \in_L X_m \ell \leq B_m,$" and insert -- $\sum_{\ell \in L} x_{m\ell} \leq B_m,$ --, therefor.

In Column 25, Line 39, in Claim 15, delete "$x_m\ell$" and insert -- $x_{m\ell}$ --, therefor.

In Column 26, Line 37, in Claim 18, delete "$\sigma\ell$" and insert -- $\sigma_\ell$ --, therefor.

In Column 26, Lines 39-40, in Claim 18, delete " $R\ell^*(S\ell)=\bar{R}(p\ell^*,S\ell)$ " and insert -- $\bar{R}_\ell^*(S_\ell) = \bar{R}(p_\ell^*, S_\ell)$ --, therefor.

In Column 26, Line 41, in Claim 18, delete "$c_m\ell.$" and insert -- $c_{m\ell}.$ --, therefor.